United States Patent
Beck et al.

(10) Patent No.: US 10,521,748 B2
(45) Date of Patent: Dec. 31, 2019

(54) RETENTION RISK DETERMINER

(71) Applicant: Workday, Inc., Pleasanton, CA (US)

(72) Inventors: Daniel Walter Beck, Menlo Park, CA (US); Mohammad Sabah, San Jose, CA (US); Adeyemi Ajao, San Francisco, CA (US); James Fan, San Mateo, CA (US); Parag Avinash Namjoshi, Redwood City, CA (US); Kevin Mun Joun Tham, Alameda, CA (US); Vladimir Giverts, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 1014 days.

(21) Appl. No.: 14/578,954

(22) Filed: Dec. 22, 2014

(65) Prior Publication Data

US 2016/0180264 A1    Jun. 23, 2016

(51) Int. Cl.
*G06Q 10/06* (2012.01)

(52) U.S. Cl.
CPC .............................. *G06Q 10/0635* (2013.01)

(58) Field of Classification Search
None
See application file for complete search history.

(56) References Cited

U.S. PATENT DOCUMENTS

| | | | | |
|---|---|---|---|---|
| 2008/0168063 A1* | 7/2008 | Whitson | ............... | G06F 21/604 |
| 2009/0276296 A1* | 11/2009 | Spriegel | ................ | G06Q 10/00 |
| | | | | 705/7.38 |
| 2011/0307303 A1* | 12/2011 | Dutta | .................... | G06Q 10/00 |
| | | | | 705/7.42 |
| 2013/0166358 A1* | 6/2013 | Parmar | ............ | G06Q 10/06393 |
| | | | | 705/7.39 |
| 2014/0344174 A1 | 11/2014 | Ruan | | |

(Continued)

FOREIGN PATENT DOCUMENTS

| CA | 2666264 A1 * | 12/2009 | ............. G06Q 10/06 |
|---|---|---|---|
| JP | 2003323544 | 11/2003 | |

(Continued)

OTHER PUBLICATIONS

Rohit Punnoose and Pankaj Ajit, "Prediction of Employee Turnover in Organizations using Machine Learning Algorithms," 2016, International Journal of Advanced Research in Artificial Intelligence, vol. 5, No. 9, pp. 22-26 (Year: 2016).*

*Primary Examiner* — Amanda Gurski

(74) *Attorney, Agent, or Firm* — Van Pelt, Yi & James LLP

(57) ABSTRACT

A system for determining retention risk comprises a grouper, a filter, a normalizer, a feature vector extractor, a model builder, and a predictor. The grouper is for determining a set of time series of transactions where each is associated with one employee. The filter is for filtering the set of time series of transactions based on an employee transition characteristic to determine a subset of time series. The normalizer is for determining a model set of time series by normalizing the subset of time series. The feature vector extractor is for determining a set of feature vectors determined from a time series of the model set of time series. The model builder is for determining one or more models based at least in part on the set of feature vectors. The predictor is for predicting retention risk for a given employee using the one or more models.

12 Claims, 20 Drawing Sheets

(56) References Cited

U.S. PATENT DOCUMENTS

2016/0078352 A1* 3/2016 Pallath .................... G06T 11/60
 706/11
2016/0132595 A1* 5/2016 Bliss ................. G06F 17/30864
 707/706

FOREIGN PATENT DOCUMENTS

| JP | 2007206801 | 8/2007 |
| JP | 2009266039 | 11/2009 |
| JP | 2009295017 | 12/2009 |
| JP | 2011210004 | 10/2011 |

* cited by examiner

500

Feature Vector

| Feature Name | Feature Value |
|---|---|
| 502 — Number-Of-Job-Functions | 3 |
| 504 — Tenure | 15 |
| 506 — Promoted-Every-x-Years | 3 |
| 508 — Has-Moved-Job-Functions | 1 |
| 510 — Number-Of-Locations | 2 |
| 512 — Time-In-Current-Job-Function | 4 |

Weight Vector

| Feature Name | Weight |
|---|---|
| 552 — Number-Of-Job-Functions | -0.625 |
| 554 — Tenure | -0.566 |
| 556 — Promoted-Every-x-Years | -0.461 |
| 558 — Has-Moved-Job-Functions | -0.278 |
| 560 — Number-Of-Locations | -0.067 |
| 562 — Time-In-Current-Job-Function | 0.313 |

Fig. 5B

| HOW IS RISK CALCULATED? | | |
|---|---|---|
| 50% BASED ON: TIME IN CURRENT JOB FUNCTION TENURE OF THE EMPLOYEE IN THE MOST RECENT JOB FUNCTION ◇ HIGH RISK: > 5 YEARS △ MEDIUM RISK: 3-5 YEARS ○ LOW RISK: < 3 YEARS | 29% BASED ON: TENURE NUMBER OF YEARS THE EMPLOYEE HAS BEEN EMPLOYED ◇ HIGH RISK: < 3 YEARS △ MEDIUM RISK: 3-6 YEARS ○ LOW RISK: > 6 YEARS | 11% BASED ON: NUMBER OF LOCATIONS NUMBER OF DIFFERENT JOB LOCATIONS/GEOGRAPHIES THAT THE EMPLOYEE HAS WORKED IN DURING HIS TENURE ◇ HIGH RISK: 0-1 LOCATIONS △ MEDIUM RISK: 2 LOCATIONS ○ LOW RISK: > 2 LOCATIONS |
| 7% BASED ON: NUMBER OF JOB FUNCTIONS NUMBER OF JOB FUNCTIONS HELD BY THE EMPLOYEE DURING HIS TENURE ◇ HIGH RISK: 0-2 JOB FUNCTIONS △ MEDIUM RISK: 3 JOB FUNCTIONS ○ LOW RISK: > 3 JOB FUNCTIONS | 2% BASED ON: TIME BETWEEN PROMOTIONS FREQUENCY OF PROMOTION OF THE EMPLOYEE DURING HIS TENURE ◇ HIGH RISK: > 4 YEARS △ MEDIUM RISK: 2-4 YEARS ○ LOW RISK: < 2 YEARS | 1% BASED ON: HAS THE EMPLOYEE CHANGED JOB FUNCTIONS? WHETHER OR NOT THE EMPLOYEE HAS WORKED IN MORE THAN ONE JOB FUNCTION DURING HIS TENURE ◇ HIGH RISK: NO ○ LOW RISK: YES |

Fig. 16

RETENTION RISK DETERMINER

BACKGROUND OF THE INVENTION

A large business may employ many people across different company divisions. Across their career, employees can have many employment transactions, for instance, promotions, changing divisions, changing locations, leaving the company, etc. Some employees stay in the same job function and location for a long period of time, some change function and/or location more often. However, a company invests significantly in its employees. So, if an employee leaves the company, the business loses both time and money as it replaces the employee that has just left.

BRIEF DESCRIPTION OF THE DRAWINGS

Various embodiments of the invention are disclosed in the following detailed description and the accompanying drawings.

FIG. 5A is a diagram illustrating an embodiment of a feature vector.

FIG. 5B is a diagram illustrating an embodiment of a weight vector.

FIG. 16 is an embodiment of a table illustrating an embodiment of risk prediction display.

DETAILED DESCRIPTION

Figure 1:
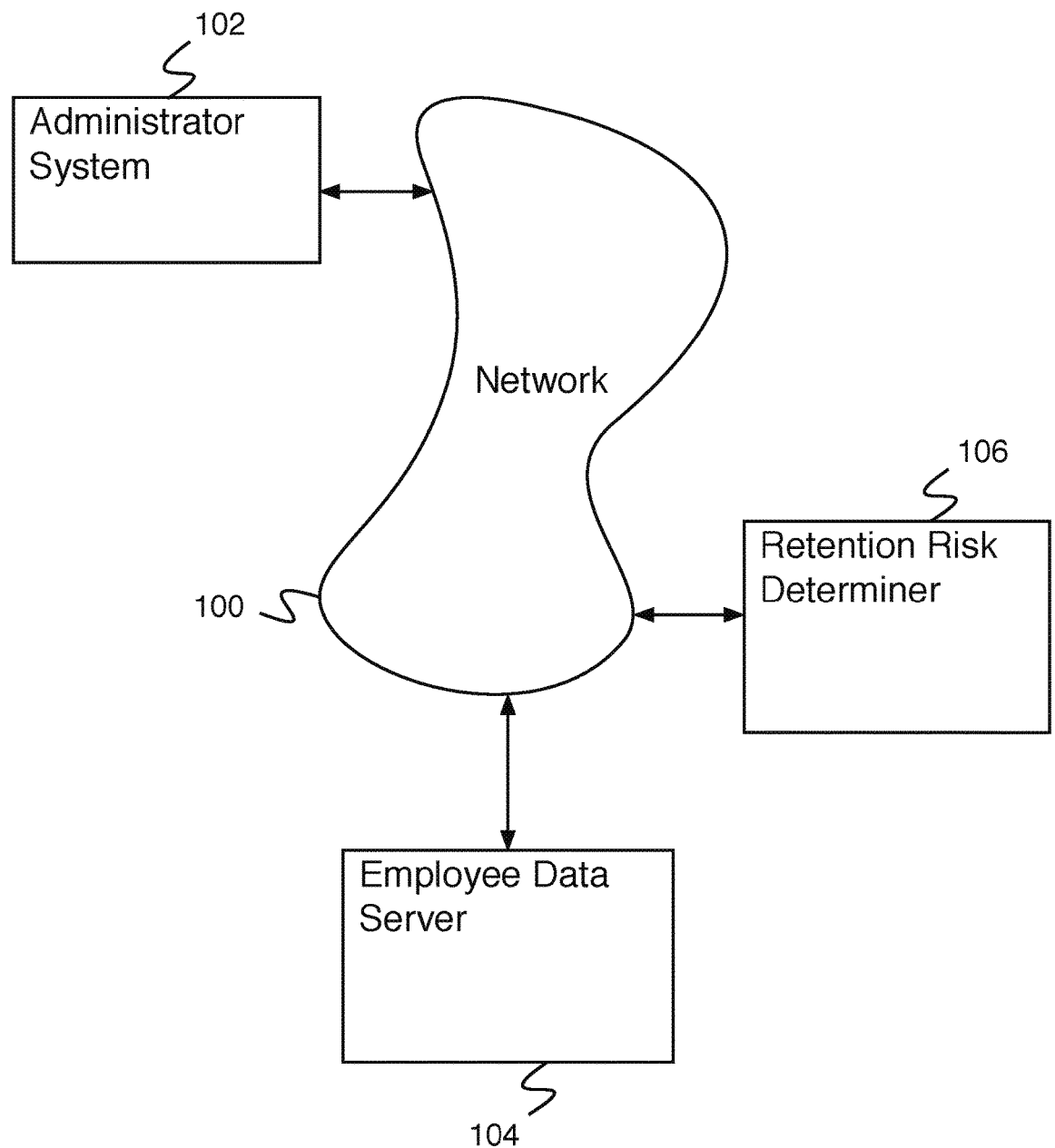
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining retention risk is disclosed. The system for determining retention risk comprises a grouper for determining a set of time series of transactions using employment data, wherein each time series of transactions is associated with one employee, a filter for filtering the set of time series of transactions based on an employee transition characteristic to determine a subset of time series, a normalizer for determining a model set of time series by normalizing the subset of time series, a feature vector extractor for determining a set of feature vectors, wherein each feature of the set of feature vectors is determined from a time series of the model set of time series, a model builder for determining one or more models based at least in part on the set of feature vectors, and a predictor for predicting retention risk for a given employee using the one or more models.

A system for retention risk determination is disclosed. In some embodiments, the system for retention risk determination receives a set of employee transaction data (e.g., employee title changes, employee location changes, company division changes, etc.) and creates a model for determining the chance or risk that a given employee will leave the company (e.g., within the next year). The system for retention risk determination groups transactions from the set of employee transaction data by employee and sorts the transactions associated with each employee to create a set of time series of transactions, each time series associated with one employee. In various embodiments, transactions comprise promotions, location changes, job title changes, manager changes, pay changes, shift changes, hiring, firing, layoffs, voluntarily leaving, or any other appropriate employee transactions. A time series of transactions associated with an employee comprises a series of transactions, ordered by time (e.g., time and date) of transactions, describing the course of the employee's career at the company. For example, a time series of transactions for an employee comprises a hire transaction, a first pay raise transaction, a first promotion transaction, a location change transaction, a second pay raise transaction, a second promotion transaction, a manager change transaction, and a voluntary leave transaction. Each transaction comprises appropriate transaction information (e.g., transaction type, transaction date, new salary, new location, new manager, new job title, new job function, etc.). The set of time series of transactions is filtered based at least in part on a transition characteristic to remove employees that do not contribute useful information to the model (e.g., a transition characteristic comprises one or more of the following: employees that left for reasons not related to retention practices, employees that have died, employees that have retired, employees that were hired on a temporary basis, contractors, employees that only stayed at the company for a very short time, etc.). A model set of time series is then determined from the filtered set of time series of transactions by normalizing transactions. In some embodiments, normalizing a transaction comprises determining a normalized job title and/or a normalized job level associated with the transaction. In some embodiments, a normalized job title comprises a job title selected from a set of normalized job titles, wherein the set of normalized job titles is smaller than the set of job titles (e.g., normalizing job titles associated with the set of transactions reduces the total number of job titles associated with the set of transactions). In some embodiments, a normalized job level comprises a job level selected from a set of normalized job levels, wherein the set of normalized job levels is smaller than the set of job levels (e.g., normalizing job level associated with the set of transactions reduces the total number of job levels associated with the set of transactions). In some embodiments, the model set of time series is divided by employment length (e.g., bucketing, using a bucketer module or bucketer, a time series associated with employees employed from 1-5 years are sorted into a first category—or for year n to m, time series associated with employees employed from 5-10 years are sorted into a second category—or for year m to k, etc.). In various embodiments, a bucketer module is before feature vector extraction, after feature vector extraction, or at any other appropriate time to enable multiple models of the data. A feature vector is then determined from each time series of the model set of time series. In some embodiments, each feature of the feature vector comprises a data metric determined from the time series (e.g., total employment time, number of job functions, average duration between promotions, whether employee has ever changed job function, total number of job locations employee has worked at, time in the current job function, etc.). A model is built using machine learning algorithms (e.g. Support Vector Machine) on the set of time series and the set of feature vectors determined from the time series with each employee being represented by a feature vector. In some embodiments, supervised learning models are used wherein each feature vector comprises a label that represents whether the associated employee left the company voluntarily. The supervised learning model determines a weight for each feature that shows the influence and correlation of the feature in providing the best accuracy of predicting retention risk. In some embodiments, cross validation is used to measure the statistical significance and accuracy of prediction—for example, by having the model train on a first set of employee feature vectors and by applying the trained model on a second set of employee feature vectors. The first set of employee feature vectors and the second set of employee feature vectors are non-overlapping to avoid bias in training and to make the model generalizable. The trained models are then applied to determine the probability that an active employee, represented by a time series and a feature vector, will leave the company (e.g., within the next year). In some embodiments, a separate model is built for each employment length division. Once the model is built, a predictor can use the model to determine retention risk for a given employee. The predictor receives a time series of transactions associated with the given employee, normalizes the time series, determines a feature vector from the normalized time series, and makes a prediction based on the feature vector and the model.

In some embodiments, the normalizer normalizes one or more of job function, job titles, job families such that the number of job functions, job titles, and/or job families is reduced. In various embodiments, the normalizer performs its function before or after grouping, before or after filtering, before feature vector generation, or at any other appropriate time.

FIG. 1 is a block diagram illustrating an embodiment of a network system. In some embodiments, the network system of FIG. 1 comprises a system for determining retention risk. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, employee data server 104, and retention risk determiner 106 communicate via network 100. In various embodiments, administrator system 102 comprises a system for an administrator to access data on employee data server 104, to determine retention risk using retention risk determiner 106, or for any other appropriate purpose. Employee data server 104 comprises a system for storing employee data. In some embodiments, employee data server 104 comprises a system for storing employee data for a company. In various embodiments, employee data server 104 comprises a system for storing current employee data, past employee data, employee transaction data, or any other appropriate employee data. Retention risk determiner 106 comprises a system for determining retention risk. In some embodiments, retention risk determiner 106 comprises a system for building a model to determine retention risk. In some embodiments, a model to determine retention risk is based at least in part on data stored in employee data server 104. In some embodiments, retention risk determiner 106 comprises a system to determine retention risk for a given employee based at least in part on a model. In some embodiments, retention risk determiner 106 uses historic data from employee data server 104 regarding employees to build and test a model for retention and using the model to determine retention risk for a given employee.

Figure 2:
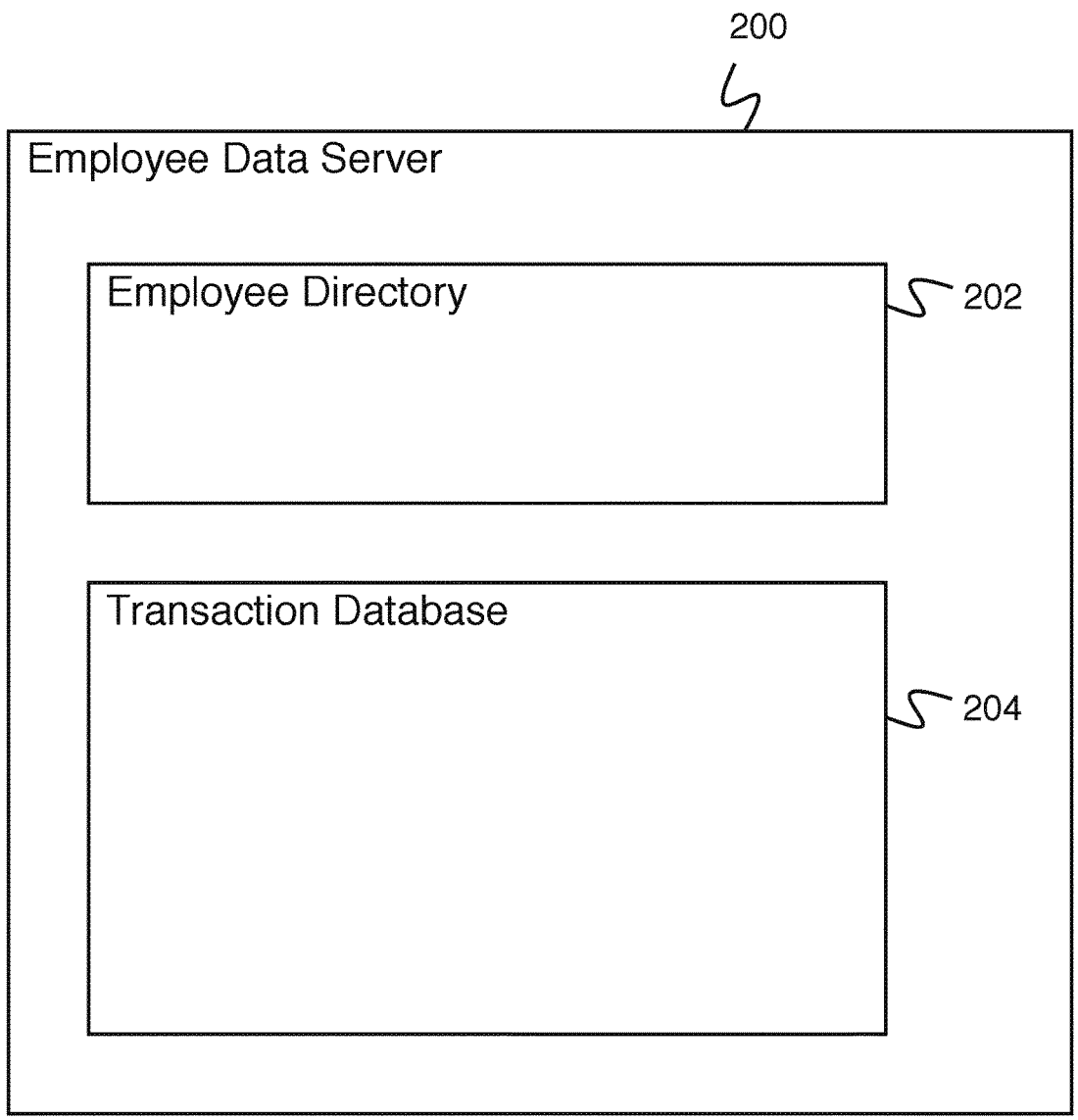
FIG. 2 is a block diagram illustrating an embodiment of an employee data server.

FIG. 2 is a block diagram illustrating an embodiment of an employee data server. In some embodiments, employee data server 200 comprises employee data server 104 of FIG. 1. In the example shown, employee data server 200 comprises employee directory 202 and transaction database 204. Employee directory 202 comprises employee information. In various embodiments, employee information comprises employee name, an employee identifier, employee job title, employee division, employee location, employee salary, employee supervisor, employee age, or any other appropriate employee information. Transaction database 204 comprises a set of employee transactions. In some embodiments, an employee transaction comprises a record of an employee event. In various embodiments, an employee event comprises hiring, firing, promotion, demotion, changing groups, changing locations, changing salary rate, changing supervisor, retirement, death, or any other appropriate employee event. In some embodiments, a transaction comprises a record of employee information before and after the employee event.

Figure 3A:
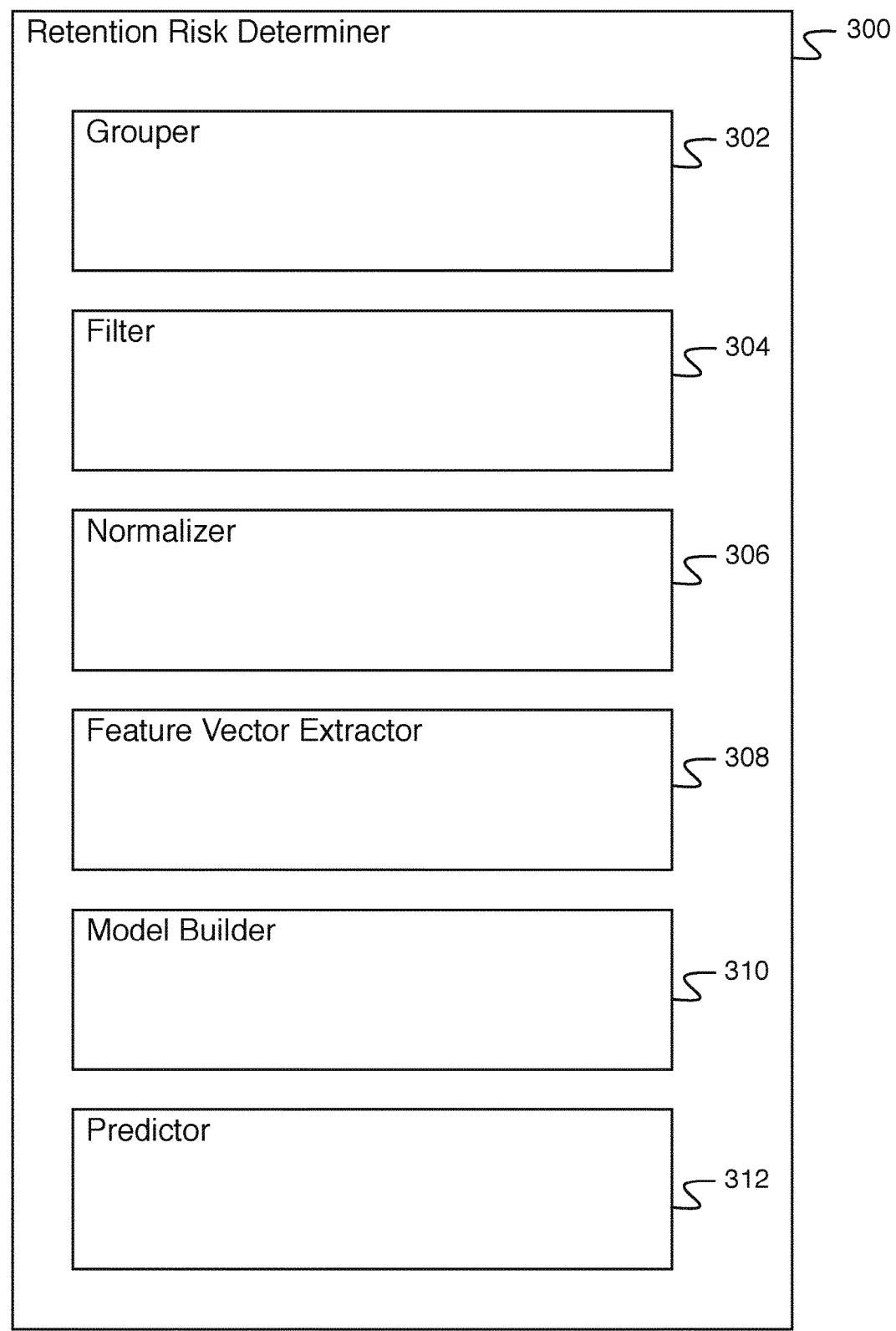
FIG. 3A is a block diagram illustrating an embodiment of a retention risk determiner.

FIG. 3A is a block diagram illustrating an embodiment of a retention risk determiner. In some embodiments, retention risk determiner 300 comprises retention risk determiner 106 of FIG. 1. In the example shown, retention risk determiner 300 comprises grouper 302. In some embodiments, grouper 302 comprises a grouper for grouping employee data (e.g., transactions) associated with one employee into a time series. In some embodiments, grouper 302 aggregates employee data by employee. In some embodiments, grouper 302 additionally sorts employee data (e.g., by transaction date). In some embodiments, grouper 302 is implemented using a processor. Retention risk determiner 300 additionally comprises filter 304. In some embodiments, filter 304 comprises a filter for filtering employees (e.g., for removing a time series associated with an employee from a set of time series). In various embodiments, the filter filters based on transition characteristics and comprises a filter for removing employees that retired, employees that died, employees that only worked at the company a short time, employees hired on a temporary basis, contractors, or any other appropriate employees. In some embodiments, filter 304 is implemented using a processor. Retention risk determiner 300 additionally comprises normalizer 306. In some embodiments, normalizer 306 comprises a normalizer for normalizing transactions. In various embodiments, normalizing a transaction comprises determining a normalized employee job title associated with an employee job title, determining a normalized employee level associated with an employee level, determining a normalized currency value (e.g., converting a currency value to a specific currency based on the conversion rate at the applicable date) associated with an employee salary (e.g., converting to dollars on the date the salary was changed or input), or normalizing transaction data in any other appropriate way. In some embodiments, the normalizer normalizes one or more of job function, job titles, job families such that the number of job functions, job titles, and/or job families is reduced. In various embodiments, the normalizer performs its function before or after grouping, before or after filtering, before feature vector generation, or at any other appropriate time. In some embodiments, normalizer 306 is implemented using a processor. Retention risk determiner 300 additionally comprises feature vector extractor 308. In some embodiments, feature vector extractor 308 comprises a component or module for extracting a feature vector from a time series. In some embodiments, extracting a feature vector from a time series comprises determining a set of features from a time series. In various embodiments, a feature of a feature vector comprises number of job functions, total employment time, average duration between promotions, whether job function has changed, number of locations, time in current job function, or any other appropriate feature. In some embodiments, feature vector extractor 308 is implemented using a processor. Retention risk determiner 300 additionally comprises model builder 310. In some embodiments, model builder 310 receives a set of feature vectors and builds one or more models. In some embodiments, a model comprises a weight vector. In some embodiments, model builder 310 is implemented using a processor. Retention risk determiner 300 comprises predictor 312. In some embodiments, predictor 312 comprises a predictor for predicting retention risk based on a model. In some embodiments, predicting retention risk based on a model comprises computing a dot product of a feature vector and a weight vector. In some embodiments, predictor 312 is implemented using a processor. In various embodiments, modules of retention risk determiner 300 are all implemented on a single processor, are each implemented on separate processors, are implemented combined onto multiple processors in any appropriate way, or are implemented in any other appropriate way. In various embodiments, retention risk determiner 300 additionally comprises an input interface (e.g., for receiving transactions), an output interface (e.g., for providing a retention risk), a bucketer (e.g., for separating time series by an employee characteristic—e.g., by time worked at the company), or any other appropriate module.

In some embodiments, a bucketer functioning is performed after feature vector extraction 308 and before model builder 310. In some embodiments, a bucketer module buckets incoming data using an employee characteristic. For example, the employees are separated into four buckets (e.g., employee tenure at the company for 1-5 years, 6-10 years, 11-15 years, and 16 or greater years). In various embodiments, each bucket of data is used to create a separate model (e.g., one for each bucket of employee tenure at the company). In various embodiments, a bucketer module buckets using an employee characteristic (e.g., employee's department, employee's level (e.g., director, manager, officer, vice president, associate, technician, etc.) and for each bucket a separate model is built with the goal that the models achieve better matching to actual behavior.

Figure 3B:
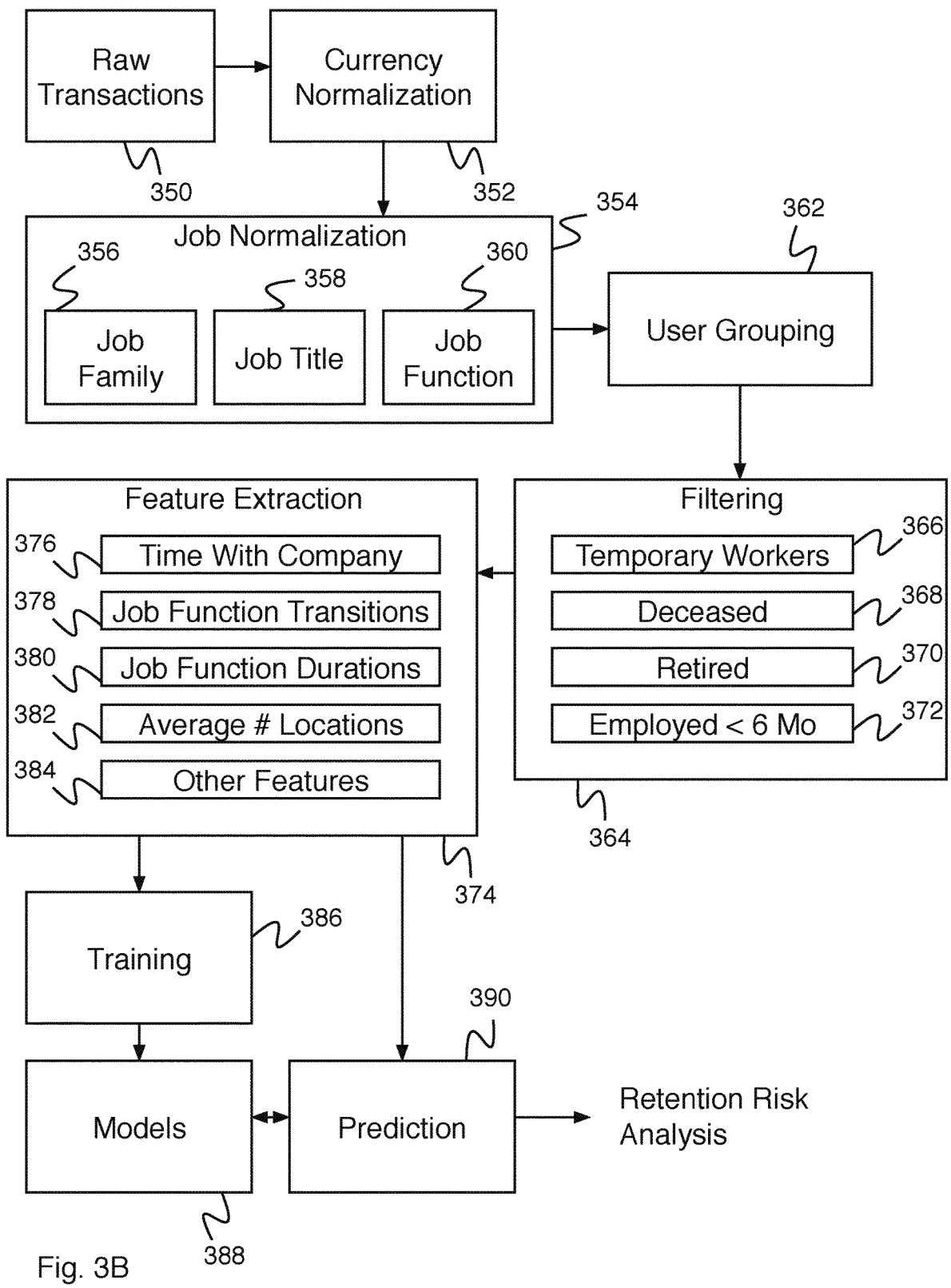
FIG. 3B is a block diagram illustrating an embodiment of a retention risk determiner.

FIG. 3B is a block diagram illustrating an embodiment of a retention risk determiner. In some embodiments, the retention risk determiner of FIG. 3B comprises retention risk determiner 106 of FIG. 1. In the example shown, raw transactions 350 comprise a set of transactions. In some embodiments, raw transactions 350 are received from employee data server 104 of FIG. 1. In the example shown, raw transactions 350 are received by currency normalization 352. Currency normalization 352 normalizes currency information (e.g., by normalizing distinct currencies to a common currency so their value can be compared directly, by accounting for inflation, etc.). Transactions normalized by currency normalization 352 are received by job normalization 354. Job normalization 354 normalizes transactions across job titles, job family, and/or job titles (e.g., using job family normalization 356, job title normalization 358, and job function normalization 360). In some embodiments, job normalization comprises replacing job information (e.g., a job title) with normalized job information, so that different jobs can be compared more directly. For example, two different companies/divisions/business units use different job titles for equivalent roles, making them difficult to compare. Job normalization replaces the job titles at one or both of the companies with normalized job titles such that equivalent roles at the different companies/divisions/business units are associated with the same normalized job title. Transactions normalized by job normalization 354 are grouped by user by user grouping 362. User grouping 362 groups transactions associated with a single user into a time series of transactions associated with that user. Filtering 364 filters based at least in part on a transition characteristic the set of time series produced by user grouping 362. In various embodiments, filtering 364 filters (e.g., removing) time series associated with a transition characteristic—for example, associated with one or more of the following: time series associated with temporary workers (e.g., using temporary workers filter 366), time series associated with deceased workers (e.g., using deceased workers filter 368), time series associated with retired workers (e.g., using retired workers filter 370), time series associated with workers employed by the company for less than 6 months (e.g., employed <6 months filter 372), or any other appropriate filters. Feature extraction 374 extracts features from time series received from filtering 364. In various embodiments feature extraction 374 extracts features related to an employee time with the company (e.g., using time with company feature extraction 376), features related to job function transitions (e.g., using job function transitions feature extraction 378), features related to job function durations (e.g., using job function durations feature extraction 380), features related to an average number of locations (e.g., using average # locations feature extraction 382), or any other appropriate features (e.g., using other features feature extraction 384). In some embodiments, a feature vector comprises an ordered combination of features. Feature vectors extracted by feature extraction 374 are received by training 386 and by prediction 390. Training 386 trains models 388 using received feature vectors. In some embodiments, the model is trained on a subset of the extracted feature vectors and tested on a different subset of the extracted feature vectors. In some embodiments, once the model correctly predicts retention risk for more than a predetermined threshold of the testing feature vectors, the model is used to predict retention risk for feature vectors associated with a separate set of employees (e.g., those that have not yet made transitions out of the company). In some embodiments, correctly predicting retention risk for a feature vector comprises determining a retention risk that is above a threshold risk in the event that the feature vector is associated with an employee who left the company and determining a retention risk that is below the threshold risk in the event that the feature vector is associated with an employee who did not leave the company. Prediction 390 then uses models 388 to determine retention risk for users associated with received feature vectors.

Figure 4:
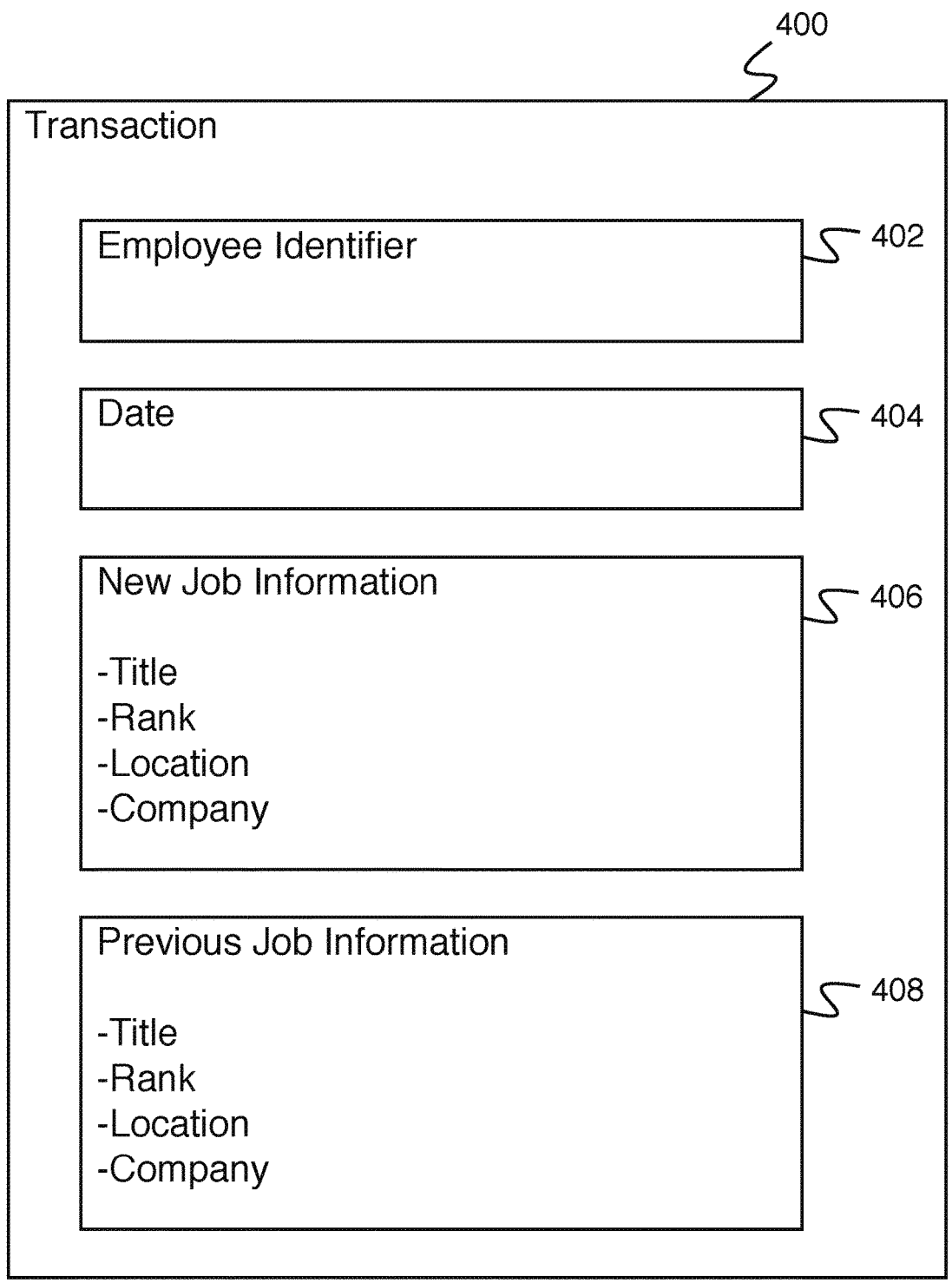
FIG. 4 is a diagram illustrating an embodiment of a transaction.

FIG. 4 is a diagram illustrating an embodiment of a transaction. In some embodiments, any appropriate number of transactions (e.g., transaction 400) are stored in a transaction database (e.g., transaction database 204 of FIG. 2). In the example shown, transaction 400 comprises employee identifier 402 (e.g., an employee ID, a unique employee identifier, etc.), date 404 (e.g., a transaction date), new job information 406, and previous job information 408. New job information 406 comprises any appropriate new job information (e.g., job title, job function, rank, location, company, supervisor, salary, shift, etc.). In some embodiments, new job information indicates a different company or no company (e.g., transaction 400 indicates the employee left the company). In some embodiments, transaction 400 indicates a job transition within the company (e.g., to a new rank, title, location, supervisor, salary, etc.). Previous job information 408 comprises any appropriate previous job information (e.g., title, rank, location, company, supervisor, salary, etc.). In some embodiments, previous job information indicates a different company or no company (e.g., transaction 400 indicates that the employee joined the company).

FIG. 5A is a diagram illustrating an embodiment of a feature vector. In some embodiments, feature vector 500 comprises a feature vector for representing features extracted from a time series of transactions (e.g., transaction 400 of FIG. 4). In some embodiments, each feature of feature vector 500 comprises the result of a calculation that is determined from a time series of transactions. In some embodiments, a computed feature vector comprises a set of feature vector values. In the example shown, feature vector 500 comprises a set of determined feature values for an example employee. Feature 502 comprises Number-Of-Job-Functions. In some embodiments, determining feature 502 comprises determining the total number of job functions represented in the time series. In the example shown, it is determined that 3 job functions are represented in the time series. Feature 504 comprises Tenure. In some embodiments, computing feature 504 comprises determining the total duration of time at the company in the time series. In the example shown, it is determined that the time series represents 15 years of tenure. Feature 506 comprises Promoted-Every-x-Years. In some embodiments, computing feature 506 comprises determining the average time between promotions found in the time series. In the example shown, it is determined that the time series represents an average of 3 years between promotions. Feature 508 comprises Has-Moved-Job-Functions. In some embodiments, computing feature 508 comprises determining whether the employee has ever moved job functions in the time series. In the example shown, it is determined from the time series that the employee has moved job functions. Feature 510 comprises Number-Of-Locations. In some embodiments, computing feature 510 comprises determining the total number of job locations (e.g., the number of locations the employee has worked at) represented in the time series. In the example shown, it is determined from the time series that the employee has worked at 2 locations. Feature 512 comprises Time-In-Current-Job-Function. In some embodiments, computing feature 512 comprises determining the total amount of time in the current job function found in the time series. In the example shown, it is determined from the time series that the employee has been in the current job function for 4 years.

FIG. 5B is a diagram illustrating an embodiment of a weight vector. In some embodiments, weight vector 550 comprises a set of weights associated with a set of features (e.g., the set of features shown in feature vector 500 of FIG. 5A). In some embodiments, weight vector 550 comprises an output from a model builder (e.g., model builder 310 of FIG. 3A). In some embodiments, weight vector 550 comprises a model. In some embodiments, the sign of a weight of weight vector 550 represents the direction of the contribution of the associated feature to retention risk, and the value of a weight of weight vector 550 represents the strength of the contribution of the associated feature to retention risk. Weight 552 comprises a Number-Of-Job-Functions weight. In some embodiments, weight 552 is multiplied by a total number of job functions represented in the time series and the product is added to a retention risk value. In the example shown, weight 552 comprises −0.625. Weight 554 comprises a Tenure weight. In some embodiments, weight 554 is multiplied by a tenure represented by the time series and the product is added to a retention risk value. In the example shown, weight 554 comprises −0.556. Weight 556 comprises a Promoted-Every-x-Years weight. In some embodiments, weight 556 is multiplied by the average time between promotions found in the time series and the result is added to a retention risk value. In the example shown, weight 556 comprises −0.461. Weight 558 comprises a Has-Moved-Job-Functions weight. In some embodiments, weight 558 is multiplied by whether the employee has ever moved job functions in the time series (e.g., multiplied by 1 if the employee has ever moved job functions and 0 otherwise) and the result is added to a retention risk value. In the example shown, weight 558 comprises −0.278. Weight 560 comprises a Number-Of-Locations weight. In some embodiments, weight 560 is multiplied by the total number of job locations (e.g., the number of locations the employee has worked at) represented in the time series and the result is added to a retention risk value. In the example shown, weight 560 comprises −0.067. Weight 562 comprises a Time-In-Current-Job-Function weight. In some embodiments, weight 562 is multiplied by the total amount of time in the current job function found in the time series and the result is added to a retention risk value. In the example shown, weight 562 comprises 0.313.

Figure 6A:
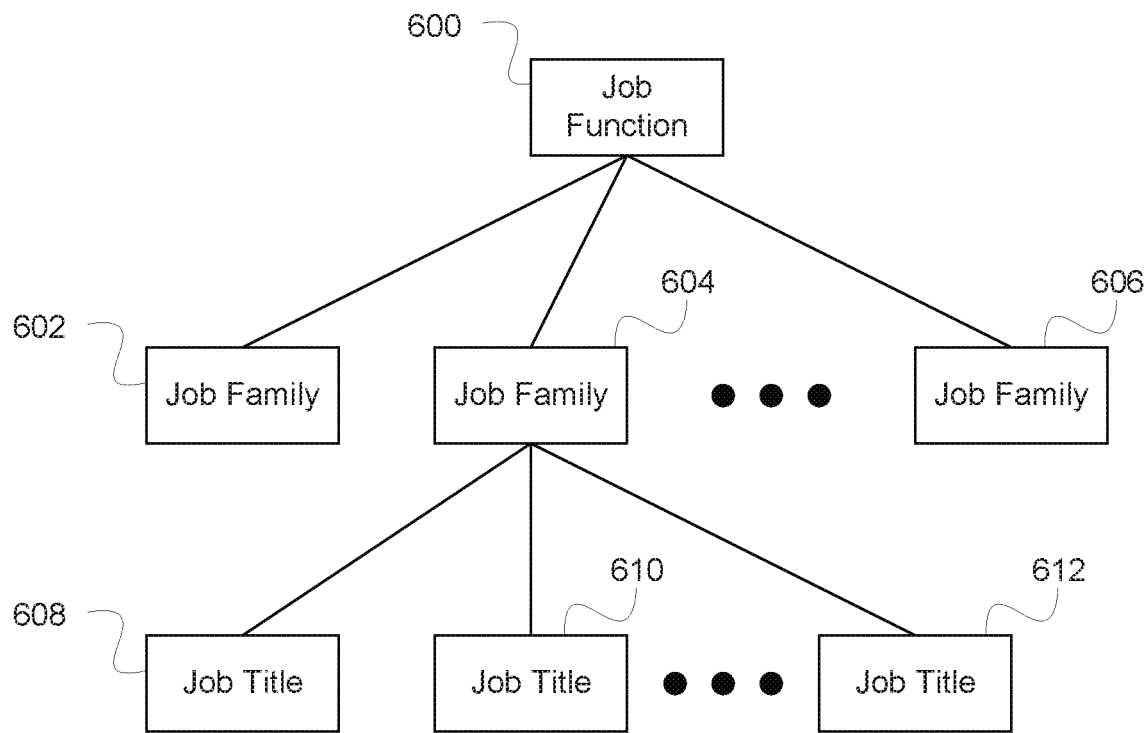
FIG. 6A is a diagram illustrating an embodiment of a job hierarchy.

FIG. 6A is a diagram illustrating an embodiment of a job hierarchy. In the example shown, a job function 600 describes a top level business unit. For example, a department of a company such as manufacturing, operations, finance, legal, etc. Subunits of job function 600 are job families (e.g., job family 602, job family 604, and job family 606). For example, within manufacturing, a number of job families are subunits: quality assurance, packing, assembly, machinery, etc. Subunits of job family 604 are job titles (e.g., job title 608, job title 610, and job title 612). For example, within machinery there are titles Machinist 1, Machinist 2, Machinist Supervisor, etc.

Figure 6B:
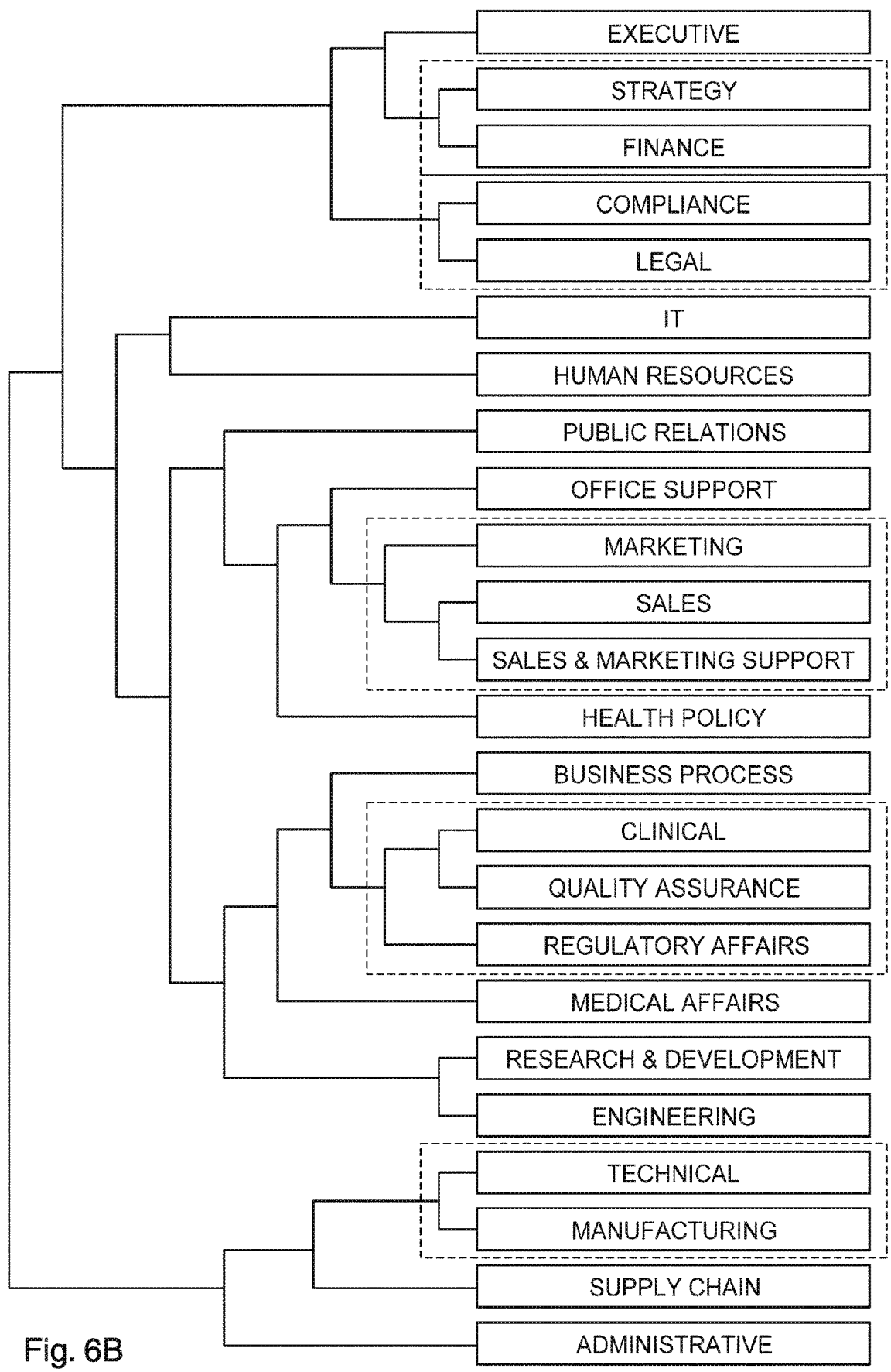
FIG. 6B is a diagram illustrating an embodiment of hierarchical job function clustering.

FIG. 6B is a diagram illustrating an embodiment of hierarchical job function clustering. In some embodiments, hierarchical job function clustering comprises a determination of a normalized job function associated with a job title. In the example shown, the hierarchical job function tree shown in FIG. 6B comprises a job function tree comprising all job functions found at a company. In some embodiments, the total number of job functions processed e.g., by retention risk determiner 300 of FIG. 3A is reduced by normalization (e.g., by normalizer 306 of FIG. 3A). In some embodiments, normalization comprises determining a normalized job function associated with a job title. In some embodiments, a normalized job function comprises a job title determined using hierarchical job clustering. In the example shown, job functions are arranged into a hierarchical organization. Selected groups of job functions (e.g., indicated using dashed lines around the groups) are determined to be close in the hierarchical organization, such that their normalized job function comprises the same job function. In some embodiments, normalizing job function comprises combining several job functions into a single normalized job function to reduce the total number of job functions. In the example shown, strategy and finance are combined into a single job function, compliance and legal are combined into a single job function, marketing, sales, and sales & marketing support are combined into a single job function, clinical, quality assurance, and regulatory affairs are combined into a single job function, and technical and manufacturing are combined into a single job function. In the example shown, 24 job functions are in this way reduced to 17. In some embodiments, job levels are clustered in a similar way to reduce the total number of job levels. In some embodiments, a process for hierarchical job function clustering uses agglomerative clustering. A normalized job function is assigned corresponding to each job function. A set of steps is taken wherein in each step two job functions are merged into a normalized job function based on which two job functions are the closest in terms of job titles within job function and employees making transitions between the job functions. The process stops when titles and transitions dictate a stop (e.g., when the two job functions determined to be closest are less close than a threshold closeness). In various embodiments, clustering is also used to cluster job titles and/or job families. In some embodiments, clustering generates a table that maps all job titles to a cluster compressing the number of titles. For example, the compression of number of titles produces 50-90% of the original number of titles.

Figure 7:
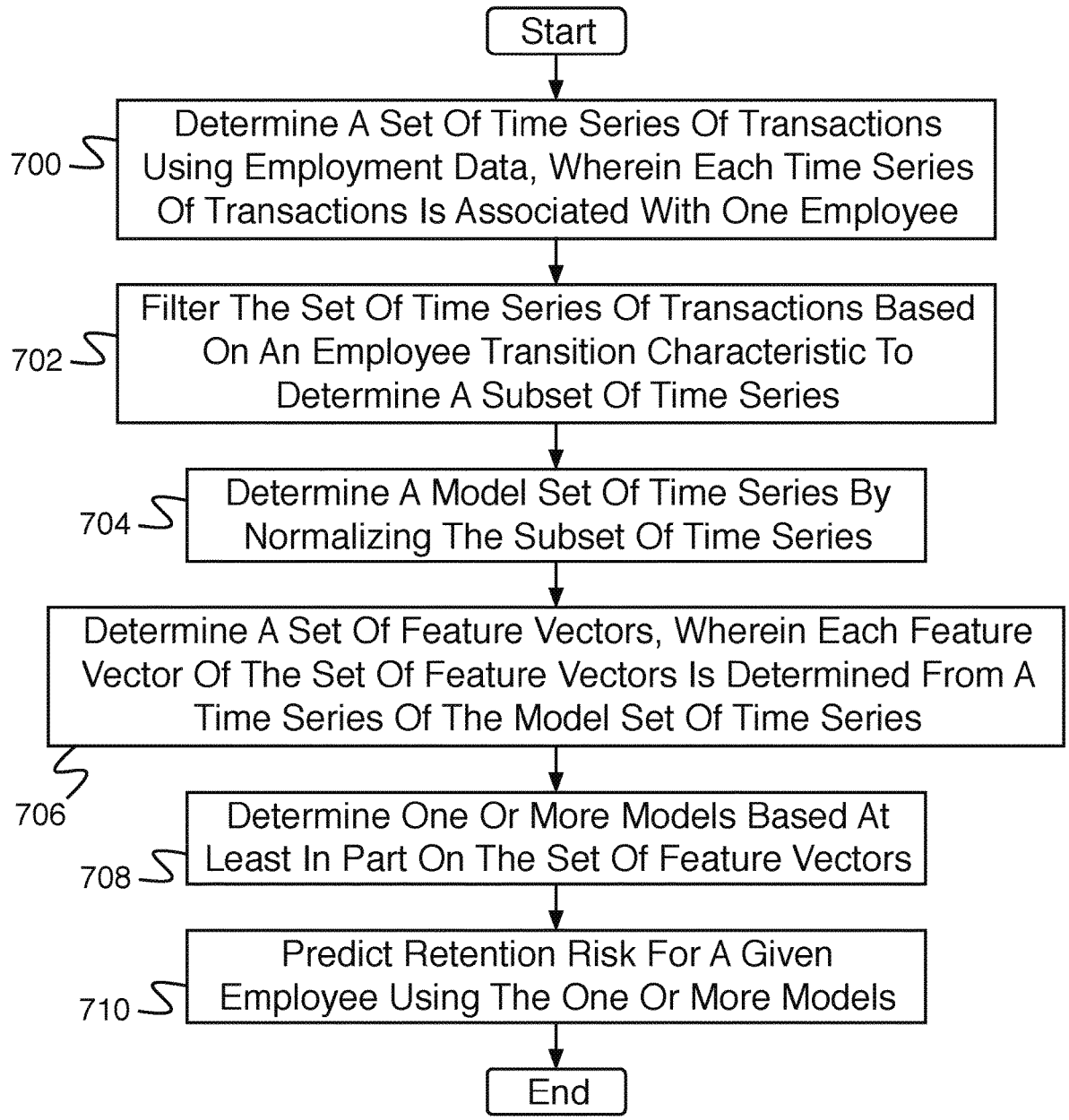
FIG. 7 is a flow diagram illustrating an embodiment of a process for predicting retention risk.

FIG. 7 is a flow diagram illustrating an embodiment of a process for predicting retention risk. In some embodiments, the process of FIG. 7 is executed by retention risk determiner 106 of FIG. 1. In the example shown in 700, a set of time series of transaction is determined using employment data, wherein each time series of transactions is associated with one employee. In some embodiments, employment data includes performance data (e.g., number of promotions per year, performance rating, sales metrics, etc.). In 702, the set of time series of transactions is filtered based on an employee transition characteristic to determine a subset of time series. In 704, a model set of time series is determined by normalizing the subset of time series. In various embodiments, normalizing the subset of time series comprises determining a normalized employee job title associated with an employee job title, determining a normalized employee level associated with an employee level, determining a normalized currency value associated with an employee salary, or normalizing subset of time series in any other appropriate way. In 706, a set of feature vectors is determined, wherein each vector of the set of feature vectors is determined from a time series of the model set of time series. In 708, one or models are determined based at least in part on the set of feature vectors. In 710, retention risk is predicted for a given employee using the one or more models.

Figure 8:
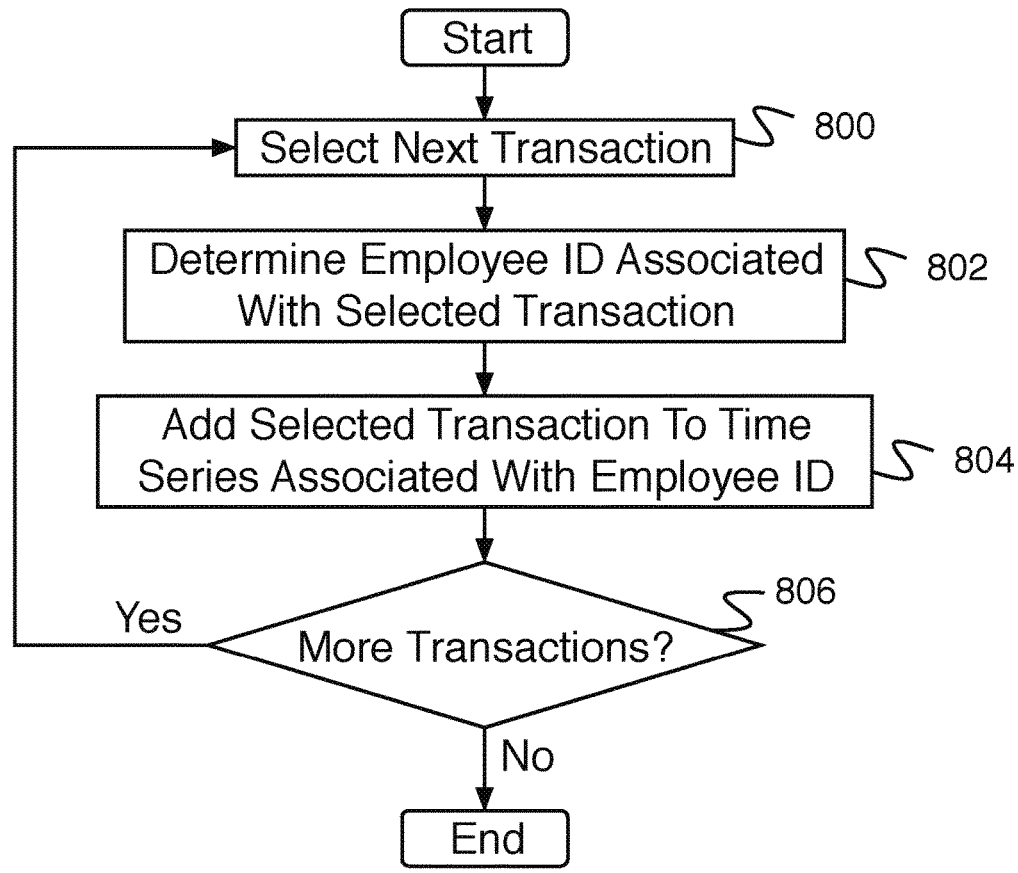
FIG. 8 is a flow diagram illustrating an embodiment of a process for determining a set of time series of transactions using employment data.

FIG. 8 is a flow diagram illustrating an embodiment of a process for determining a set of time series of transactions using employment data. In some embodiments, the process of FIG. 8 implements 700 of FIG. 7. In the example shown, in 800, the next transaction is selected. In some embodiments, the next transaction comprises the first transaction. In some embodiments, the next transaction comprises one of a set of transactions received from an employee data server (e.g., employee data server 104 of FIG. 1). In 802, an employee ID associated with the selected transaction is determined. In 804, the selected transaction is added to a time series associated with the employee ID. In some embodiments, the selected transaction is added to the end of the time series associated with the employee ID. In some embodiments, the selected transaction is added to an appropriate point in the time series associated with the employee ID such that the time series remains sorted by date. In some embodiments, in the event that no time series associated with the employee ID exists, a new time series associated with the employee ID is created and the selected transaction is added to the new time series. In 806, it is determined whether there are more transactions (e.g., more transaction received from the employee data server). In the event it is determined that there are more transactions, control passes to 800. In the event it is determined that there are not more transactions, the process ends. In some embodiments, after a set of time series of transactions is determined, each time series of the set of time series is sorted by time (e.g., such that the set of transactions is in chronological order).

Figure 9:
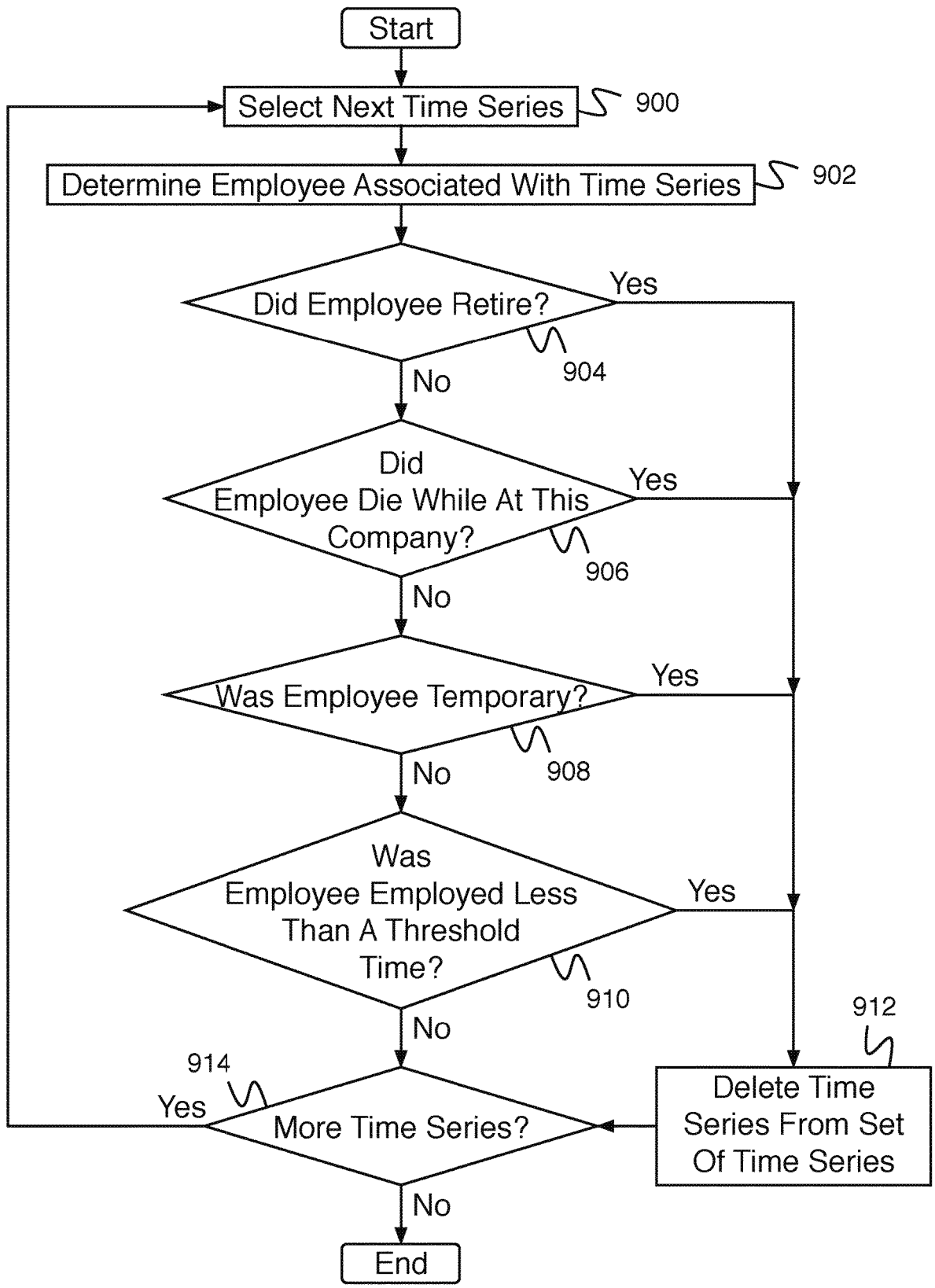
FIG. 9 is a flow diagram illustrating an embodiment of a process for filtering a set of time series of transactions.

FIG. 9 is a flow diagram illustrating an embodiment of a process for filtering a set of time series of transactions. In some embodiments, the process of FIG. 9 implements 702 of FIG. 7. In some embodiments, the process of FIG. 9 filters a set of time series of transactions received from a process for determining a set of time series of transactions (e.g., the process of FIG. 8). In some embodiments, a transition characteristic is used to determine whether or not to filter. In various embodiments, transition characteristics comprises one or more of the following: the employee retired, the employee died while employed at the company, the employee was temporary, the employee was employed less than a threshold amount of time, or any other appropriate transition characteristic. In the example shown, in 900, the next time series is selected. In some embodiments, the next time series comprises the first time series. In 902, the employee associated with the time series is determined. In various embodiments, determining the employee comprises determining the employee name, determining an employee identifier, determining associated employee information, or determining the employee in any other appropriate way. In 904, it is determined whether the employee retired. In the event it is determined that the employee retired, control passes to 912. In the event it is determined that the employee did not retire, control passes to 906. In 906, it is determined whether the employee died while employed by this company. In the event it is determined that the employee died while employed by this company, control passes to 912. In the event it is determined that the employee did not die while employed by this company, control passes to 908. In 908, it is determined whether the employee was temporary. In the event it is determined that the employee was temporary, control passes to 912. In the event it is determined that the employee was not temporary, control passes to 910. In 910, it is determined whether the employee was employed for less than a threshold time. In the event it is determined that the employee was employed for less than a threshold time, control passes to 912. In the event it is determined that the employee was not employed for less than a threshold time, control passes to 914. In 912, the time series is deleted from the set of time series (e.g., the associated employee is filtered from the set of time series). Control then passes to 914. In 914, it is determined whether there are more time series. In the event it is determined that there are more time series, control passes to 900. In the event it is determined that there are not more time series, the process ends.

Figure 10A:
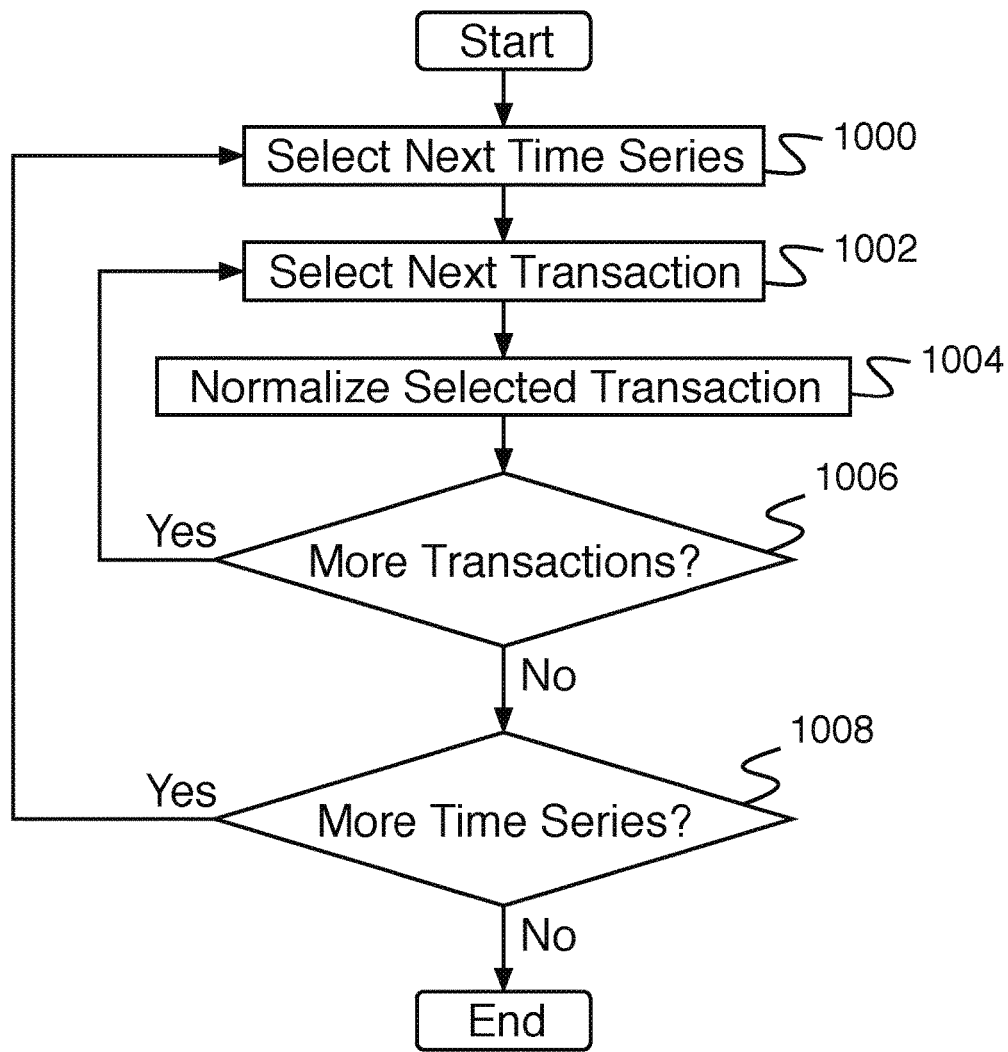
FIG. 10A is a flow diagram illustrating an embodiment of a process for determining a model set of time series by normalizing a subset of time series.

FIG. 10A is a flow diagram illustrating an embodiment of a process for determining a model set of time series by normalizing a subset of time series. In some embodiments, the process of FIG. 10A implements 704 of FIG. 7. In the example shown, in 1000, the next time series is selected. In some embodiments, the next time series comprises the first time series. In 1002, the next transaction (e.g., the next transaction of the selected time series) is selected. In some embodiments, the next transaction comprises the first transaction. In 1004, the selected transaction is normalized. In 1006, it is determined whether there are more transactions (e.g., more transactions in the selected time series). In the event it is determined that there are more transactions, control passes to 1002. In the event it is determined that there are not more transactions, control passes to 1008. In 1008, it is determined whether there are more time series. In the event it is determined that there are more time series, control passes to 1000. In the event it is determined that there are not more time series, the process ends. In some embodiments, the set of time series after each transaction of each time series has been normalized comprises a model set of time series.

Figure 10B:
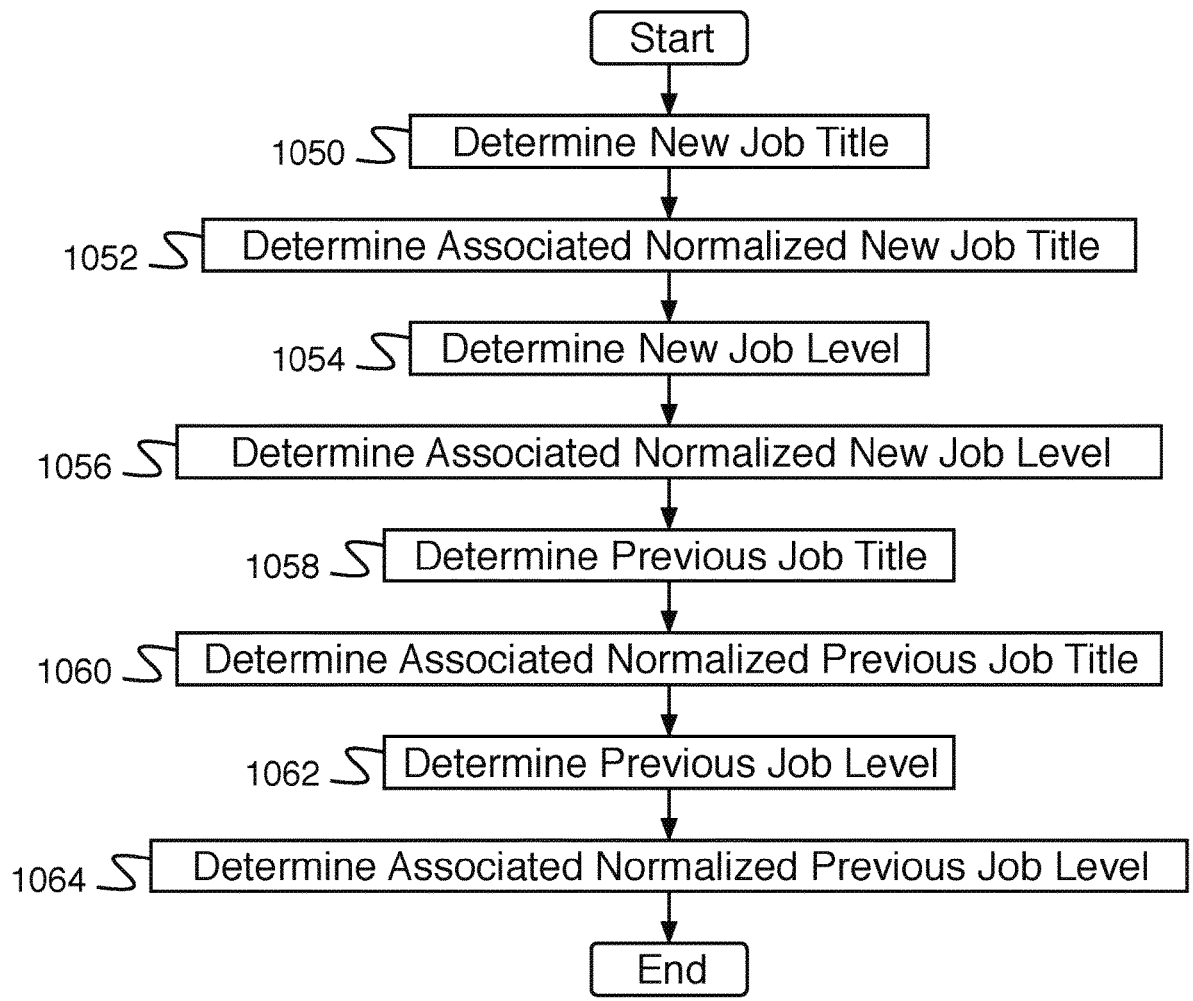
FIG. 10B is a flow diagram illustrating an embodiment of a process for normalizing a transaction.

FIG. 10B is a flow diagram illustrating an embodiment of a process for normalizing a transaction. In some embodiments, the process of FIG. 10B implements 1004 of FIG. 10A. In the example shown, in 1050, the new job title is determined (e.g., the job title associated with the new job of the transaction). In 1052, an associated normalized new job title is determined. In some embodiments, the associated normalized new job title is determined using a job title normalization table. In some embodiments, the associated normalized new job title is stored as part of the transaction. In some embodiments, the associated normalized new job title replaces the new job title in the transaction. In 1054, the new job level is determined (e.g., the job level associated with the new job of the transaction). In 1056, an associated normalized new job level is determined. In some embodiments, the associated normalized new job level is determined using a job level normalization table. In some embodiments, the associated normalized new job level is stored as part of the transaction. In some embodiments, the associated normalized new job level replaces the new job level in the transaction. In 1058, the previous job title is determined (e.g., the job title associated with the previous job of the transaction). In 1060, an associated normalized previous job title is determined. In some embodiments, the associated normalized previous job title is determined using a job title normalization table. In some embodiments, the associated normalized previous job title is stored as part of the transaction. In some embodiments, the associated normalized previous job title replaces the previous job title in the transaction. In 1062, the previous job level is determined (e.g., the job level associated with the previous job of the transaction). In 1064, an associated normalized previous job level is determined. In some embodiments, the associated normalized previous job level is determined using a job level normalization table. In some embodiments, the associated normalized previous job level is stored as part of the transaction. In some embodiments, the associated normalized previous job level replaces the previous job level in the transaction.

Figure 11:
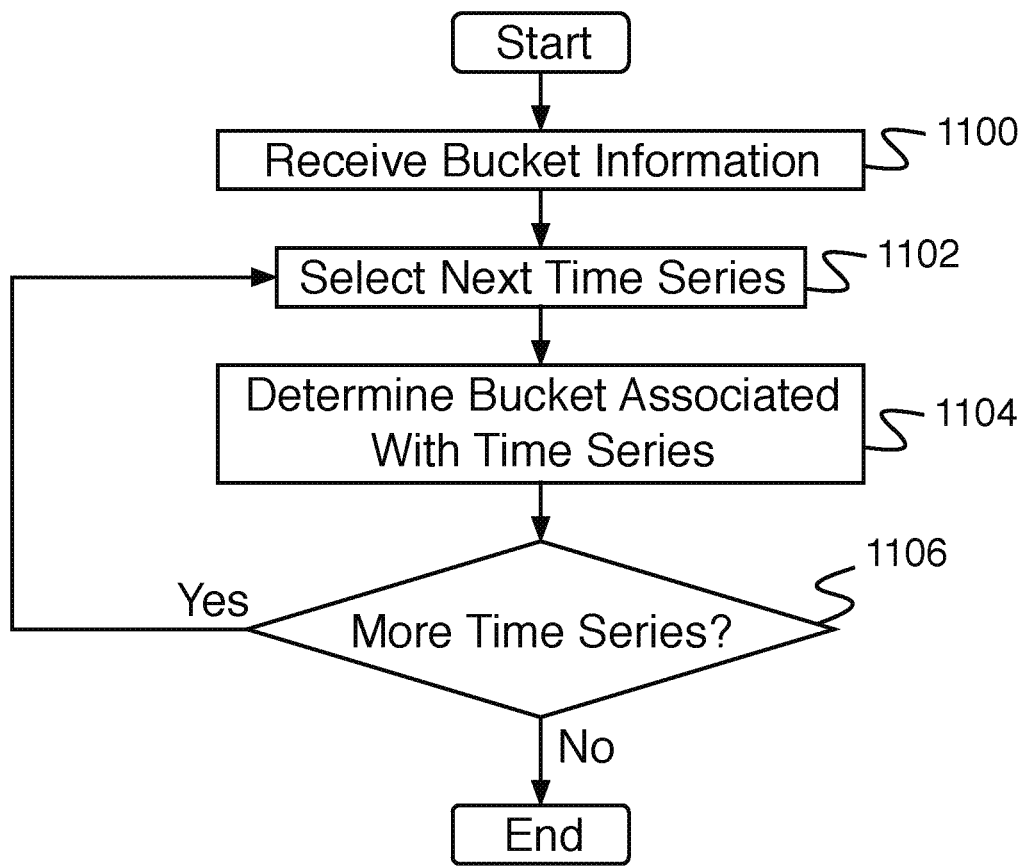
FIG. 11 is a flow diagram illustrating an embodiment of a process for sorting time series of a set of time series into buckets.

FIG. 11 is a flow diagram illustrating an embodiment of a process for sorting time series of a set of time series into buckets. In some embodiments, the process of FIG. 11 is performed by a bucketer module of retention risk determiner 106 of FIG. 1. In the example shown, in 1100, bucket information is received (e.g., from a system administrator, from stored bucket information, etc.). In some embodiments, bucket information describes a set of categories. In some embodiments, each time series of the set of time series is associated with one category of the set of categories, e.g., one "bucket". In some embodiments, the set of categories comprises employee tenure categories (e.g., employees at the company 1-5 years, employees at the company 5-10 years, employees at the company 10-20 years, etc.). In 1102, the next time series is selected. In some embodiments, the next time series comprises the first time series. In 1104, the bucket associated with the time series is determined. In some embodiments, the bucket associated with the time series is determined from the bucket information and from employee information. In 1106, it is determined whether there are more time series. In the event it is determined that there are more time series, control passes to 1102. In the event it is determined that there are not more time series, the process ends.

Figure 12:
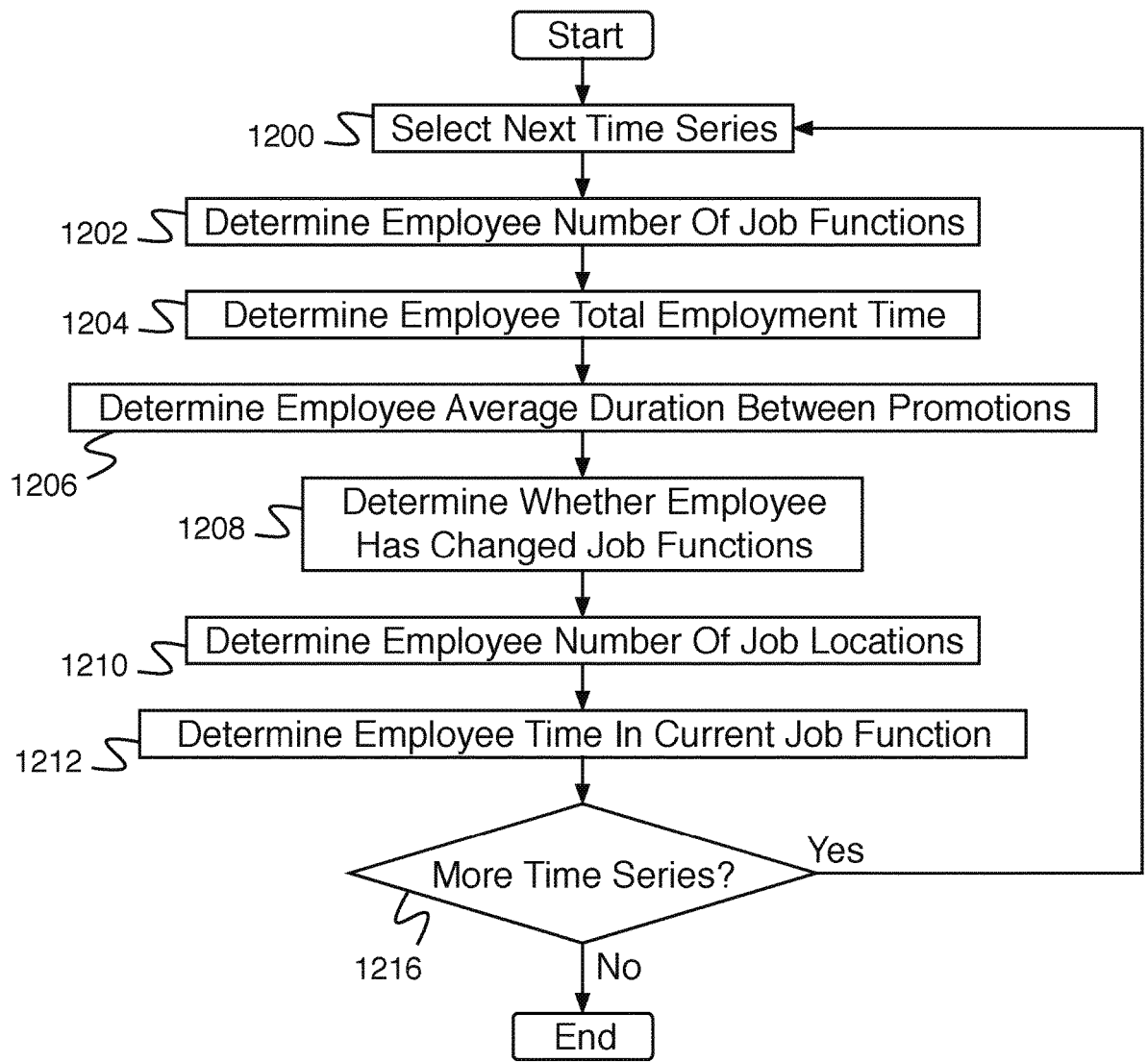
FIG. 12 is a flow diagram illustrating an embodiment of a process for determining a set of feature vectors, wherein each feature vector is determined from a time series of a set of time series.

FIG. 12 is a flow diagram illustrating an embodiment of a process for determining a set of feature vectors, wherein each feature vector is determined from a time series of a set of time series. In some embodiments, the process of FIG. 12 implements 706 of FIG. 7. In the example shown, in 1200, the next time series is selected. In some embodiments, the next time series comprises the first time series. In 1202, an employee number of job functions is determined. In some embodiments, the employee comprises the employee associated with the time series. In some embodiments, the employee number of job functions comprises the total number of job functions associated with the employee seen in the time series. In 1204, the employee total employment time is determined. In some embodiments, the employee total employment time comprises the total time at the company seen in the time series. In 1206, the employee average duration between promotions is determined. In some embodiments, the employee average duration between promotions comprises the average duration between promotions seen in the time series. In 1208, it is determined whether the employee has changed job functions. In some embodiments, whether the employee has changed job function is determined by determining whether a job function change is seen in the time series. In 1210, the employee number of job locations is determined. In some embodiments, the employee number of job locations comprises the number of job locations seen in the time series. In 1212, the employee time in the current job function is determined. In some embodiments, the employee time in the current job function comprises the time in the current job function seen in the time series. In 1216, it is determined whether there are more time series. In the event it is determined that there are more time series, control passes to 1200. In the event it is determined that there are not more time series, the process ends.

Figure 13:
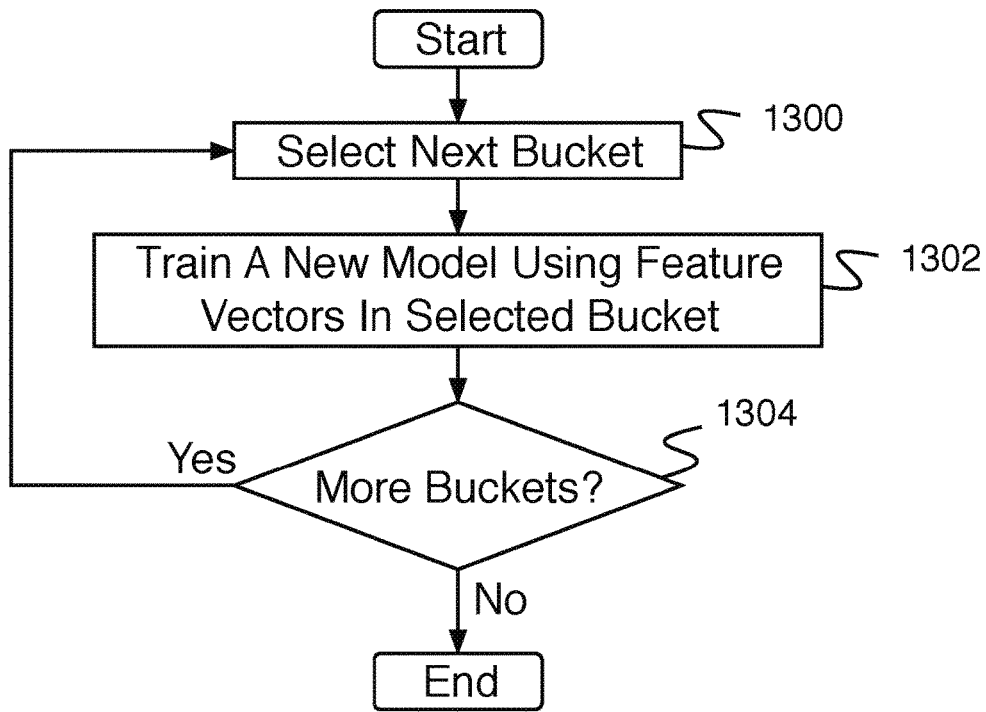
FIG. 13 is a flow diagram illustrating an embodiment of a process for determining models.

FIG. 13 is a flow diagram illustrating an embodiment of a process for determining models. In some embodiments, the process of FIG. 13 implements 708 of FIG. 7. In the example shown, in 1300, the next bucket is selected. In some embodiments, the next bucket comprises the first bucket. In some embodiments, each time series and associated feature vector is associated with a bucket. In some embodiments, each time series is associated with a bucket using the process of FIG. 11. In some embodiments, buckets have not been determined (e.g., all time series and associated feature vectors are associated with the same bucket). In 1302, a new model is trained using feature vectors in the selected bucket. In some embodiments, a model comprises a classifier for distinguishing employees (e.g., employees represented by a feature vector) that voluntarily left the company from those that did not voluntarily leave the company (e.g., within one year). In some embodiments, the model comprises a linear support vector machine. In 1304, it is determined whether there are more buckets. In the event there are more buckets, control passes to 1300. In the event there are no more buckets, the process ends.

Figure 14:
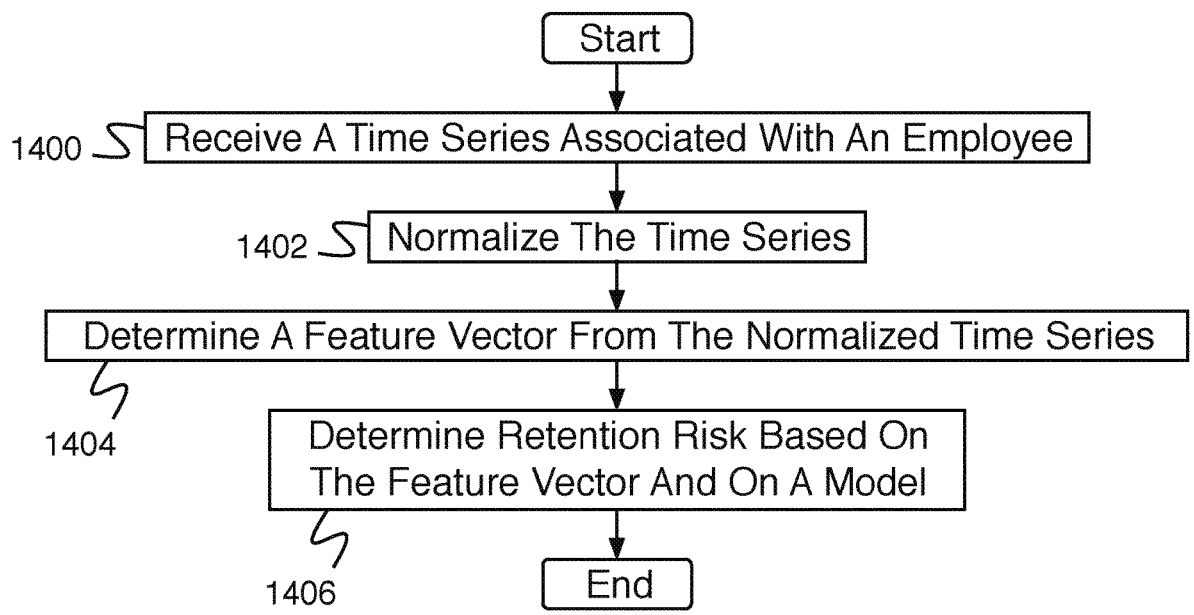
FIG. 14 is a flow diagram illustrating an embodiment of a process for predicting retention risk for a given employee using one or more models.

FIG. 14 is a flow diagram illustrating an embodiment of a process for predicting retention risk for a given employee using one or more models. In some embodiments, the process of FIG. 14 implements 710 of FIG. 7. In the example shown, in 1400, a time series associated with an employee is received. In some embodiments, a time series associated with an employee is received from a grouper (e.g., grouper 302 of FIG. 3A). In some embodiments, a time series associated with an employee comprises a grouped set of transactions associated with an employee (e.g., transactions stored in transaction database 204 of FIG. 2). In 1402, the time series is normalized (e.g., by normalizer 306 of FIG. 3A). In 1404, a feature vector is determined from the normalized time series (e.g., by feature vector extractor 308 of FIG. 3A). In 1406, retention risk is determined based on the feature vector and on a model. In some embodiments, determining retention risk comprises determining a distance between a feature vector and a classifier threshold. In some embodiments, determining retention risk comprises computing a dot product between a feature vector and a weight vector.

Figure 15:
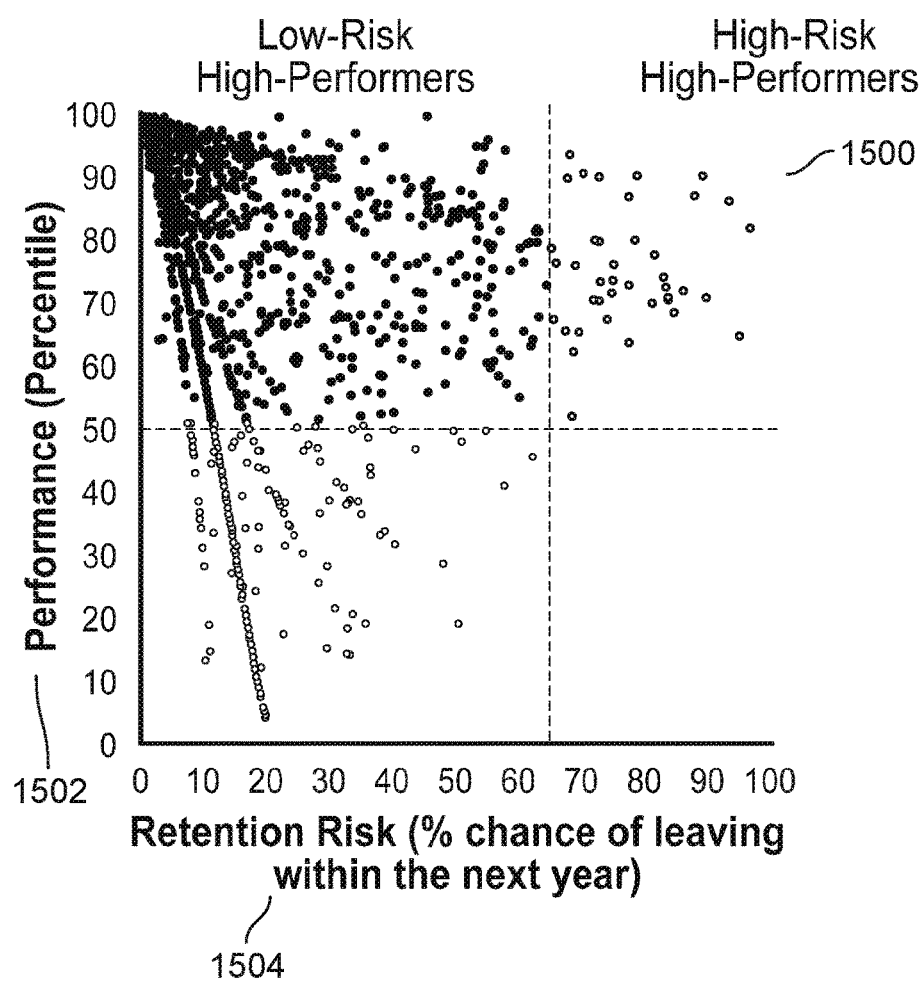
FIG. 15 is an embodiment of a graph illustrating an embodiment of risk prediction display.

FIG. 15 is an embodiment of a graph illustrating an embodiment of risk prediction display. In the example shown, risk prediction is plotted against other employment data (e.g., performance data). Graph 1500 plots retention risk (e.g., the percentage chance of leaving within the next year) along x-axis 1504 versus performance (e.g., a percentile ranking) along y-axis. Graph 1500 has user selectable parameters including pull down menu 1506 (e.g., marketing department) and pull down menu 1508 (e.g., all job titles). Retention risk and performance are segregated into high and low to yield four quadrants for graph 1500. High-risk high-performers are identified in the upper right quadrant.

FIG. 16 is an embodiment of a table illustrating an embodiment of risk prediction display. In the example shown, table 1600 shows dependencies for risk. Each dependency indicates relative weighting (e.g., weight 1602) and risk breakdown (e.g., high risk, low risk, medium risk, etc.). Time in current job function is weighted 50% and shows prediction of retention risk to be high for >5 years, medium for 3-5 years, and low for <3 years. Tenure is weighted 29% and shows prediction of retention risk to be high for <3 years, medium for 3-6 years, and low for >6 years. Number of locations is weighted 11% and shows prediction of retention risk to be high for 0-1 locations, medium for 2 locations, and low for >2 locations. Number of job functions is weighted 7% and shows predication for retention risk to be high for 0-2 job functions, medium for 3 job functions, and low for >3 job functions. Time between promotions is weighted 2% and shows prediction of retention risk to be high for >4 years, medium for 2-4 years, and low for <2 years. Has the employee changed job functions is weighted 1% and shows prediction of retention risk to be high for no and low for yes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining retention risk, comprising:
a processor; and
a memory coupled with the processor, wherein the memory is configured to provide the processor with instructions which when executed cause the processor to:
determine a set of time series of transactions using employment data, wherein each time series of transactions is associated with one employee;
filter the set of time series of transactions based on an employee transition characteristic to determine a subset of time series, comprising to:
determine whether the one employee satisfies the employee transition characteristic, the employee transition characteristic including an employee who has retired, an employee who died while at company, a temporary employee, an employee employed less than a threshold, or any combination thereof; and in response to a determination that the one employee satisfies the employee transition characteristic, delete a time series associated with the one employee from the set of time series of transactions;

separate the subset of time series into a plurality of subsets based at least in part on a duration of employment associated with the time series, comprising to:

determine whether the duration of employment falls within a first time series;

determine that the duration of employment falls within a first bucket in response to a determination that the duration of employment falls within the first time series; and determine that the duration of employment falls within a second bucket in response to a determination that the duration of employment fails to fall within the first time series, the plurality of subsets of time series including the first time series and a second time series, the first time series being non-overlapping with the second time series;

determine a model set of time series by normalizing the plurality of subsets, comprising to:

perform one or more of the following:

A) determine whether a role associated with a first job title associated with a first company, a first division, or a first business unit is equivalent to a role associated with a second job title associated with a second company, a second division, or a second business unit, the first job title being different from the second job title; and in response to a determination that the role associated with the first job title is equivalent to the role associated with the second job title, replace the first job title, the second job title, or both with a normalized job title; or B) determine whether a role associated with a first job level associated with a first company, a first division, or a first business unit is equivalent to a role associated with a second job level associated with a second company, a second division, or a second business unit, the first job level being different from the second job level; and in response to a determination that the role associated with the first job level is equivalent to the role associated with the second job level, replace the first job level, the second job level, or both with a normalized job level;

determine a set of feature vectors, wherein each feature vector of the set of feature vectors is determined from a time series of the model set of time series;

determine one or more models based at least in part on the set of feature vectors, comprising to:

build a model based on a machine learning algorithm on the model set of time series and the set of feature vectors;

train the model on a first set of feature vectors to obtain a trained model; and apply the trained model on a second set of feature vectors to obtain a generalizable model, the first set of feature vectors and the second set of feature vectors being non-overlapping; and predict retention risk for the given employee using the one or more models.

2. The system of claim 1, wherein the processor is further configured to: receive, via an input interface, the employment data.

3. The system of claim 1, wherein determining a set of time series of transactions using the employment data comprises aggregating the employment data by employee.

4. The system of claim 1, wherein determining a set of time series of transactions using the employment data comprises sorting the employment data.

5. The system of claim 1, wherein a feature of a feature vector of the set of feature vectors comprises number of job functions.

6. The system of claim 1, wherein a feature of a feature vector of the set of feature vectors comprises total employment time.

7. The system of claim 1, wherein a feature of a feature vector of the set of feature vectors comprises average duration between promotions.

8. The system of claim 1, wherein a feature of a feature vector of the set of feature vectors comprises whether job function has changed.

9. The system of claim 1, wherein a feature of a feature vector of the set of feature vectors comprises number of locations.

10. The system of claim 1, wherein a feature of a feature vector of the set of feature vectors comprises time in current job function.

11. A method for determining retention risk, comprising:

determining, using a processor, a set of time series of transactions using employment data, wherein each time series of transactions is associated with one employee;

filtering the set of time series of transactions based on an employee transition characteristic to determine a subset of time series, comprising:

determining whether the one employee satisfies the employee transition characteristic, the employee transition characteristic including an employee who has retired, an employee who died while at company, a temporary employee, an employee employed less than a threshold, or any combination thereof; and in response to a determination that the one employee satisfies the employee transition characteristic, deleting a time series associated with the one employee from the set of time series of transactions;

separating the subset of time series into a plurality of subsets based at least in part on a duration of employment associated with the time series, comprising:

determining whether the duration of employment falls within a first time series;

determining that the duration of employment falls within a first bucket in response to a determination that the duration of employment falls within the first time series; and determining that the duration of employment falls within a second bucket in response to a determination that the duration of employment fails to fall within the first time series, the plurality of subsets of time series including the first time series and a second time series, the first time series being non-overlapping with the second time series;

determining a model set of time series by normalizing the plurality of subsets, comprising:

performing one or more of the following:

A) determining whether a role associated with a first job title associated with a first company, a first division, or a first business unit is equivalent to a role associated with a second job title associated with a second company, a second division, or a second business unit, the first job title being different from the second job title; and in response to a determination that the role associated with the first job title is equivalent to the role associated with the second job title, replacing the first job title, the second job title, or both with a normalized job title; or B) determining whether a role associated with a first job level associated with a first company, a first division, or a first business unit is equivalent to a role associated with a second job level associated with a second company, a second division, or a second business unit, the first job level being different from the second job level; and in response to a determination that the role associated with the first job level is equivalent to the role associated with the second job level, replacing the first job level, the second job level, or both with a normalized job level;

determining a set of feature vectors, wherein each feature vector of the set of feature vectors is determined from a time series of the model set of time series;

determining one or more models based at least in part on the set of feature vectors, comprising:
building a model based on a machine learning algorithm on the model set of time series and the set of feature vectors;
training the model on a first set of feature vectors to obtain a trained model; and
applying the trained model on a second set of feature vectors to obtain a generalizable model, the first set of feature vectors and the second set of feature vectors being non-overlapping; and predicting retention risk for a given employee using the one or more models.

12. A computer program product for determining retention risk, the computer program product being embodied in a non-transitory computer readable storage medium and comprising computer instructions for:

determining a set of time series of transactions using employment data, wherein each time series of transactions is associated with one employee;

filtering the set of time series of transactions based on an employee transition characteristic to determine a subset of time series, comprising:
determining whether the one employee satisfies the employee transition characteristic, the employee transition characteristic including an employee who has retired, an employee who died while at company, a temporary employee, an employee employed less than a threshold, or any combination thereof; and
in response to a determination that the one employee satisfies the employee transition characteristic, deleting a time series associated with the one employee from the set of time series of transactions;

separating the subset of time series into a plurality of subsets based at least in part on a duration of employment associated with the time series, comprising:
determining whether the duration of employment falls within a first time series;
determining that the duration of employment falls within a first bucket in response to a determination that the duration of employment falls within the first time series; and
determining that the duration of employment falls within a second bucket in response to a determination that the duration of employment fails to fall within the first time series, the plurality of subsets of time series including the first time series and a second time series, the first time series being non-overlapping with the second time series;

determining a model set of time series by normalizing the plurality of subsets, comprising:
performing one or more of the following:
A) determining whether a role associated with a first job title associated with a first company, a first division, or a first business unit is equivalent to a role associated with a second job title associated with a second company, a second division, or a second business unit, the first job title being different from the second job title; and in response to a determination that the role associated with the first job title is equivalent to the role associated with the second job title, replacing the first job title, the second job title, or both with a normalized job title; or B) determining whether a role associated with a first job level associated with a first company, a first division, or a first business unit is equivalent to a role associated with a second job level associated with a second company, a second division, or a second business unit, the first job level being different from the second job level; and in response to a determination that the role associated with the first job level is equivalent to the role associated with the second job level, replacing the first job level, the second job level, or both with a normalized job level;

determining a set of feature vectors, wherein each feature vector of the set of feature vectors is determined from a time series of the model set of time series;

determining one or more models based at least in part on the set of feature vectors, comprising:
building a model based on a machine learning algorithm on the model set of time series and the set of feature vectors;
training the model on a first set of feature vectors to obtain a trained model; and
applying the trained model on a second set of feature vectors to obtain a generalizable model, the first set of feature vectors and the second set of feature vectors being non-overlapping; and predicting retention risk for a given employee using the one or more models.

* * * * *